US012752586B1

(12) United States Patent
Ryba et al.

(10) Patent No.: US 12,752,586 B1
(45) Date of Patent: Oct. 6, 2026

(54) AIR SUSPENSION ASSEMBLY

(71) Applicant: GM GLOBAL TECHNOLOGY OPERATIONS LLC, Detroit, MI (US)

(72) Inventors: Michael A. Ryba, West Bloomfield, MI (US); Alexander Doss, Commerce Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 19/326,080

(22) Filed: Sep. 11, 2025

(51) Int. Cl.
*B60G 17/08* (2006.01)

(52) U.S. Cl.
CPC .......... *B60G 17/08* (2013.01); *B60G 2202/24* (2013.01)

(58) Field of Classification Search
CPC ............................ B60G 17/08; B60G 2202/24
See application file for complete search history.

(56) References Cited

U.S. PATENT DOCUMENTS

| | | | | |
|---|---|---|---|---|
| 3,726,517 | A | 4/1973 | Lutz | |
| 2005/0133978 | A1 | 6/2005 | Lemmens | |
| 2017/0037923 | A1* | 2/2017 | Sirven | B60G 13/08 |

FOREIGN PATENT DOCUMENTS

| | | | | |
|---|---|---|---|---|
| DE | 10009392 A1 | | 9/2001 | |
| EP | 2126403 B1 | * | 5/2013 | F16F 9/446 |
| JP | 2023030619 A | | 3/2023 | |
| KR | 20210026061 A | * | 3/2021 | F16F 9/36 |

OTHER PUBLICATIONS

KR-20210026061-A Machine English Translation (Year: 2021).*
German Office Action for German Application No. 102025144025.5; dated May 26, 2026; 5 pages.

* cited by examiner

*Primary Examiner* — Jason D Shanske
*Assistant Examiner* — Matthew James O'Neill
(74) *Attorney, Agent, or Firm* — CANTOR COLBURN LLP

(57) ABSTRACT

A suspension assembly includes a first damper assembly including a first chamber having a first pressure, a second damper assembly including a second chamber having a second pressure, the second chamber having a first portion fluidly connected to the first chamber and a second portion fluidly isolated from the first chamber, and one or more fluid pressure devices fluidly connected to the second chamber and configured to adjust the second pressure in the second chamber.

20 Claims, 5 Drawing Sheets

AIR SUSPENSION ASSEMBLY

INTRODUCTION

The subject disclosure relates to an air suspension assembly.

Vehicles include suspension assemblies to couple the chassis to the wheels while absorbing impact forces from the driving surface. Improvements to suspension assemblies are desirable.

SUMMARY

In one exemplary embodiment, a suspension assembly comprises a first damper assembly comprising a first chamber casing defining a first chamber having a first pressure, a second damper assembly comprising a second chamber casing defining a second chamber having a second pressure, the second chamber having a first portion fluidly connected to the first chamber and a second portion fluidly isolated from the first chamber, and one or more fluid pressure devices fluidly connected to the second chamber and configured to adjust the second pressure in the second chamber.

In addition to one or more of the features described herein, the first damper assembly comprises a first piston assembly and the second damper assembly comprises a second piston assembly.

In addition to one or more of the features described herein, the first piston assembly comprises a first chamber casing that defines the first chamber, a first piston fixed to the first chamber casing, and a first piston cylinder, the first piston being movable with respect to the first piston cylinder.

In addition to one or more of the features described herein, the first piston cylinder is configured to move into the first chamber to increase the first pressure in the first chamber.

In addition to one or more of the features described herein, the second piston assembly comprises a second piston fluidly isolating the first portion of the second chamber and the second portion of the second chamber.

In addition to one or more of the features described herein, the second piston is movable toward the second portion due to the first pressure in the first portion to increase the second pressure in the second portion.

In addition to one or more of the features described herein, the one or more fluid pressure devices is fluidly connected to the first chamber and configured to adjust the first pressure in the first chamber.

In addition to one or more of the features described herein, the suspension further comprises a fluid conduit fluidly connecting the first chamber to the first portion of the second chamber.

In addition to one or more of the features described herein, the first portion of the second chamber is an upper chamber and the second portion of the second chamber is a lower chamber, the upper and lower chambers being separated by a second piston of the second damper assembly.

In another exemplary embodiment, a vehicle comprises a suspension assembly comprising a vehicle body, a wheel, a wheel support structure that rotatably supports the wheel, and a suspension assembly that couples the vehicle body and the wheel support structure. The suspension assembly comprises a first damper assembly comprising a first chamber casing defining a first chamber having a first pressure, a second damper assembly comprising a second chamber casing defining a second chamber having a second pressure, the second chamber having a first portion fluidly connected to the first chamber and a second portion fluidly isolated from the first chamber, and one or more fluid pressure devices fluidly connected to the second chamber and configured to adjust the second pressure in the second chamber.

In addition to one or more of the features described herein, the first damper assembly comprises a first piston assembly and the second damper assembly comprises a second piston assembly.

In addition to one or more of the features described herein, the first piston assembly comprises a first chamber casing that defines the first chamber, a first piston fixed to the first chamber casing, and a first piston cylinder fixed to the wheel support structure and movable with respect to the first piston.

In addition to one or more of the features described herein, the first piston cylinder is configured to move into the first chamber due to forces transmitted from the wheel to increase the first pressure of the first chamber.

In addition to one or more of the features described herein, the second piston assembly comprises a second piston fluidly isolating the first portion of the second chamber and the second portion of the second chamber.

In addition to one or more of the features described herein, the second piston is movable toward the second portion due to the first pressure in the first portion to increase the second pressure in the second portion.

In addition to one or more of the features described herein, the vehicle further comprises one or more controllers configured to control the one or more fluid pressure devices to adjust the second pressure in the second chamber.

In addition to one or more of the features described herein, the one or more controllers is configured to set a first ride frequency mode and control the second pressure to correspond to the first ride frequency mode, and the one or more controllers is configured to set a second ride frequency mode and control the second pressure to correspond to the second ride frequency mode.

In addition to one or more of the features described herein, the one or more controllers is configured to set any intermediate ride frequency mode between the first ride frequency mode and the second ride frequency mode by adjusting the second pressure.

In addition to one or more of the features described herein, the vehicle further comprises a fluid conduit fluidly connecting the first chamber to the first portion of the second chamber.

In yet another exemplary embodiment, a vehicle comprises a vehicle body, a wheel, a wheel support structure that rotatably supports the wheel, one or more controllers, and a suspension assembly that couples the vehicle body and the wheel support structure. The suspension assembly comprises a first damper assembly comprising a first chamber casing defining a first chamber having a first pressure, a second damper assembly comprising a second chamber casing defining a second chamber having a second pressure, the second chamber having a first portion fluidly connected to the first chamber and a second portion fluidly isolated from the first chamber, a fluid conduit fluidly connecting the first chamber to the first portion of the second chamber, and one or more fluid pressure devices fluidly connected to the second chamber and configured to adjust the second pressure in the second chamber. The one or more fluid pressure devices is fluidly connected to the first chamber and configured to adjust the first pressure in the first chamber. The first damper assembly comprises a first piston assembly and the second damper assembly comprises a second piston assembly. The first piston assembly comprises a first chamber casing that defines the first chamber, a first piston fixed to the first chamber casing, and a first piston cylinder fixed to the wheel support structure and movable with respect to the first piston. The first piston cylinder is configured to move into the first chamber due to forces transmitted from the wheel to increase the first pressure of the first chamber. The first portion of the second chamber is an upper chamber and the second portion of the second chamber is a lower chamber. The second piston assembly comprises a second piston fluidly isolating the upper chamber and the lower chamber. The second piston is movable toward the second portion due to the first pressure in the first portion to increase the second pressure in the second portion. The one or more controllers is configured to control the one or more fluid pressure devices to adjust the second pressure in the second chamber. The one or more controllers is configured to set a first ride frequency mode and control the second pressure to correspond to the first ride frequency mode. The one or more controllers is configured to set a second ride frequency mode and control the second pressure to correspond to the second ride frequency mode. The one or more controllers is configured to set any intermediate ride frequency mode between the first ride frequency mode and the second ride frequency mode by adjusting the second pressure.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
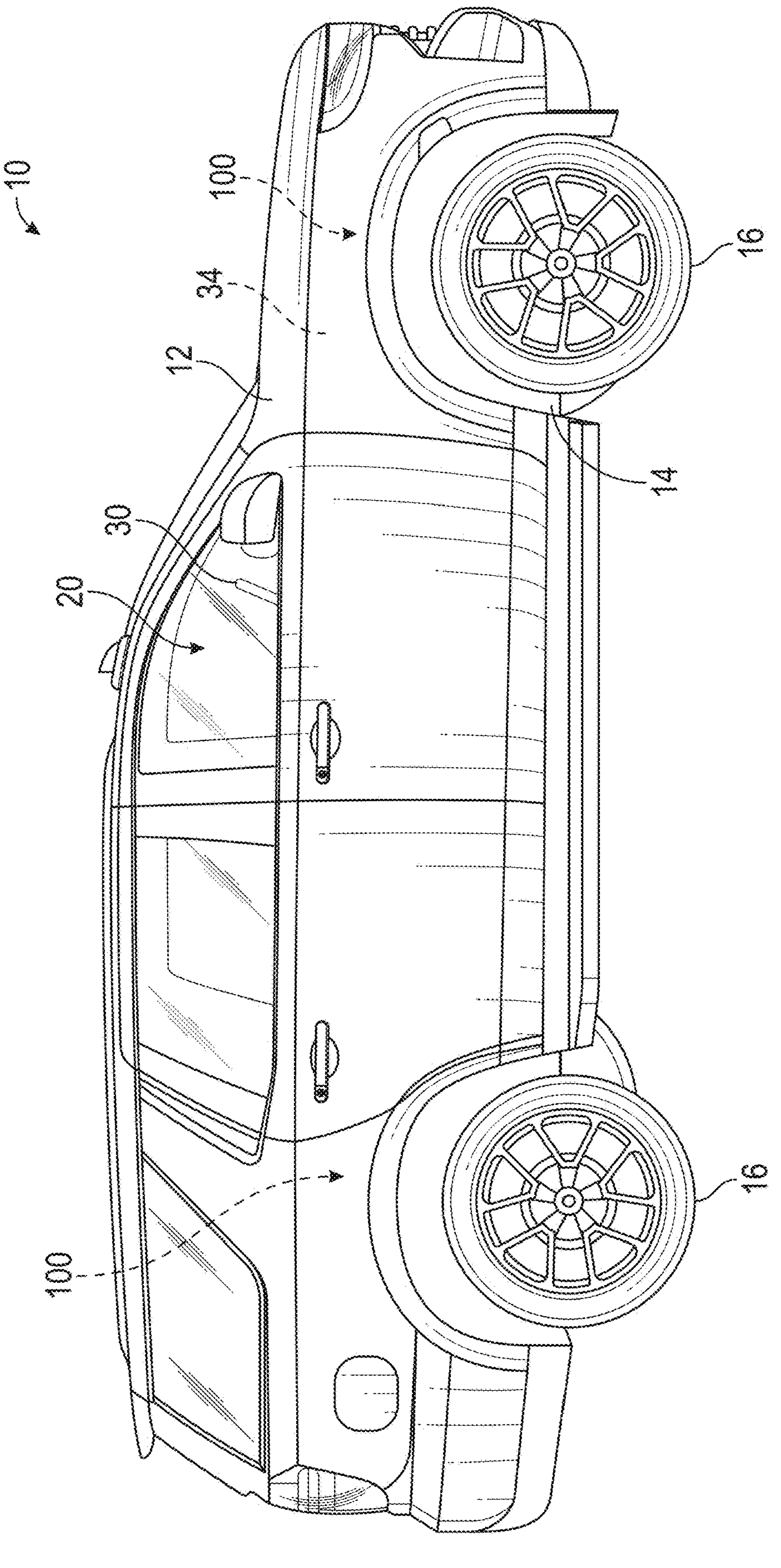
FIG. 1 is a right side view of a vehicle including a suspension assembly according to a non-limiting example.

The following description is merely exemplary in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A vehicle 10 according to a non-limiting example is shown in FIG. 1. The vehicle 10 includes a vehicle body 12 that includes a chassis 14 supported on a plurality of wheels 16. One or more of the plurality of wheels 16 are steerable. The vehicle body 12 defines, in part, a passenger compartment 20. A steering control 30 may be arranged within the passenger compartment 20. The steering control 30 may be operated to control orientation of the steerable wheel(s) 16.

The vehicle 10 includes a prime mover 34 connected to a gear assembly and/or transmission that provides power to one or more of the plurality of wheels 16. The prime mover 34 may be an engine, a motor, a hybrid engine and motor system, or other prime movers known in the art. A rechargeable energy storage system (RESS), not shown, may be arranged in the vehicle body 12 and may provide power to components within the vehicle 10 (e.g., the prime mover 34).

The vehicle 10 includes a plurality of suspension assemblies 100 that couple the chassis 14 to the wheels 16. The suspension assemblies 100 absorb impact forces from a driving surface transmitted through the wheels 16 to reduce forces experienced by the chassis 14. Each of the wheels 16 may be coupled to one of the suspension assemblies 100.

Figure 2:
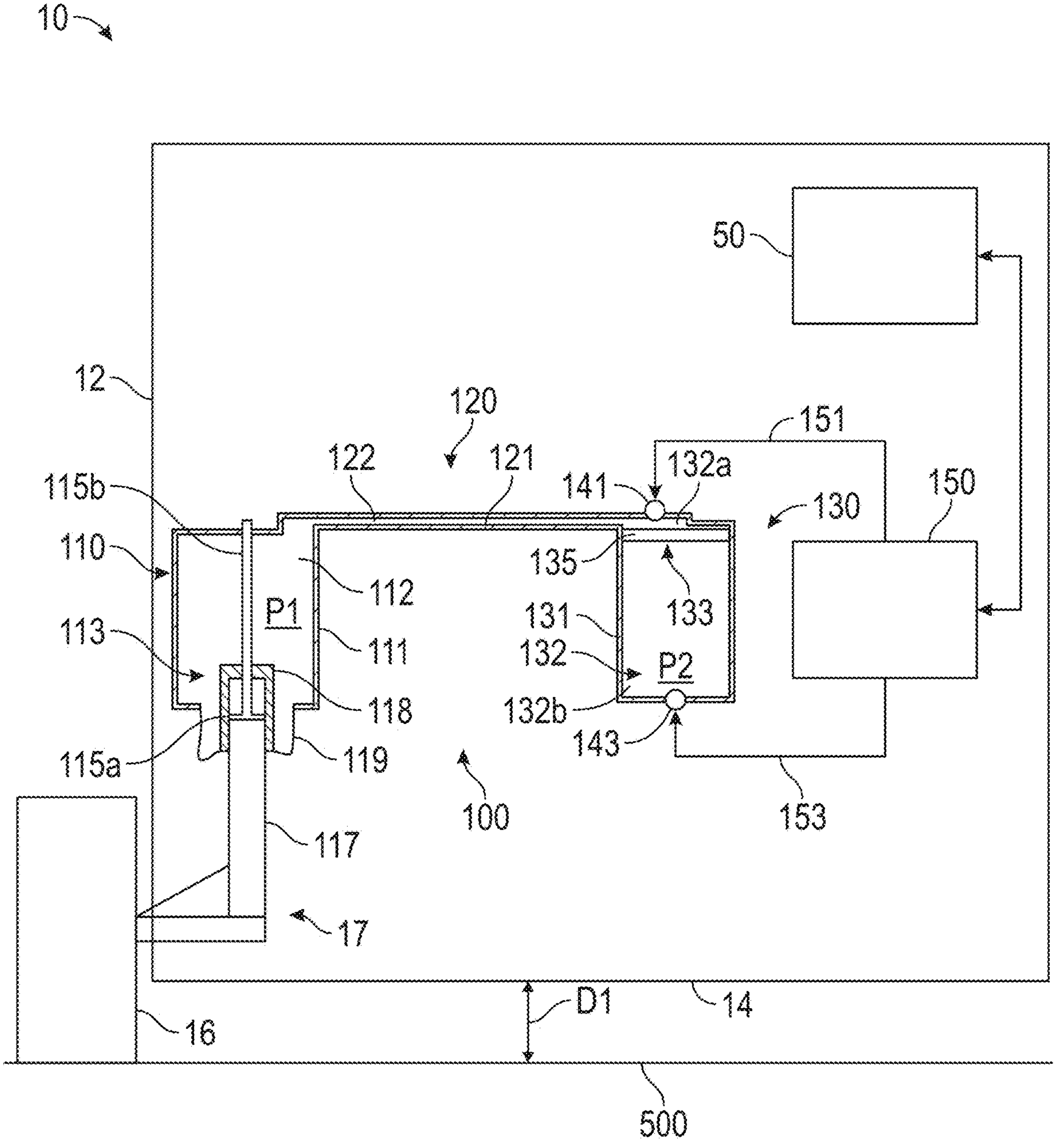
FIG. 2 is a schematic view of a suspension assembly according to one or more embodiments in a first configuration.
Figure 3:
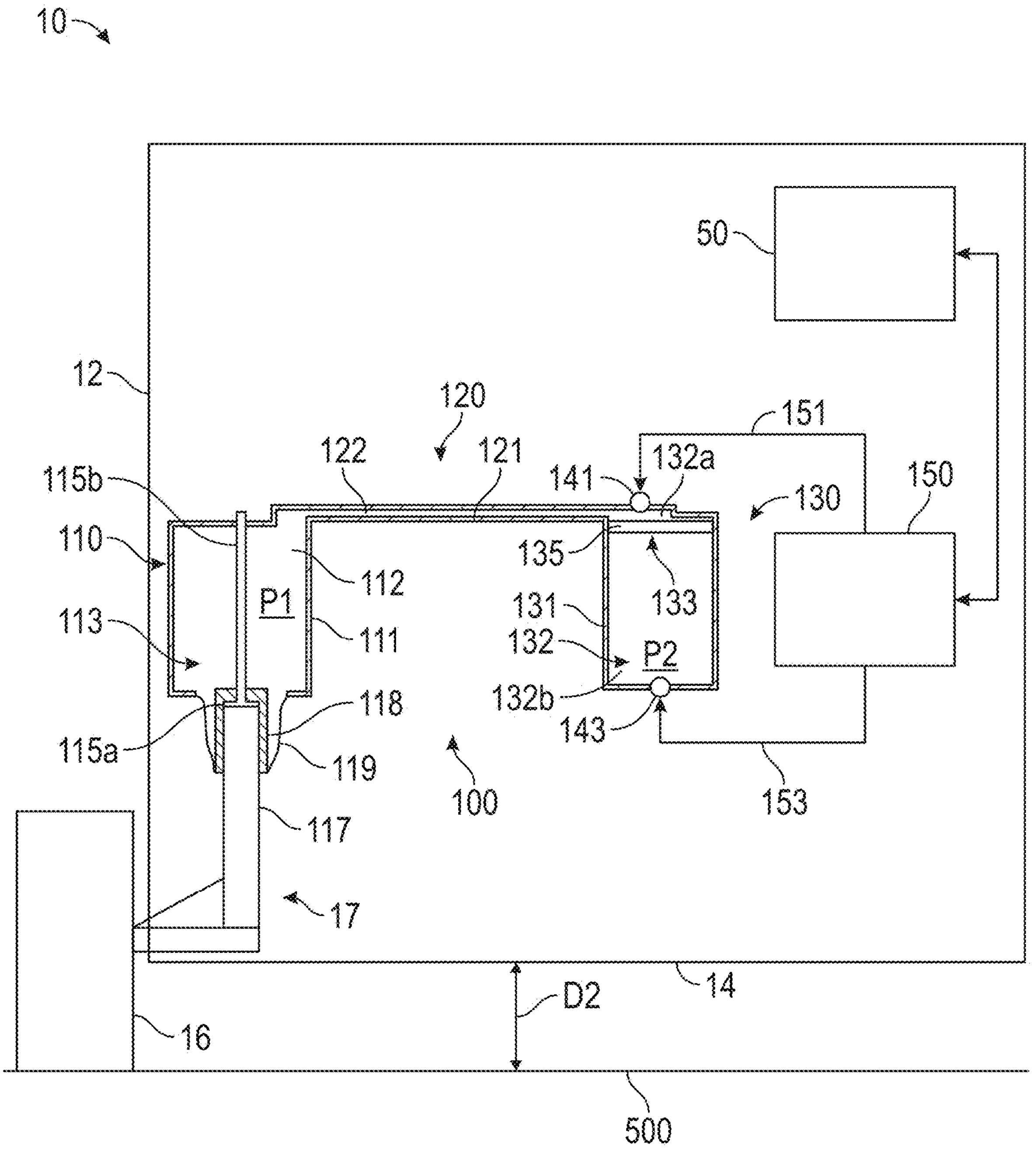
FIG. 3 shows the suspension assembly of FIG. 2 in a second configuration.
Figure 4:
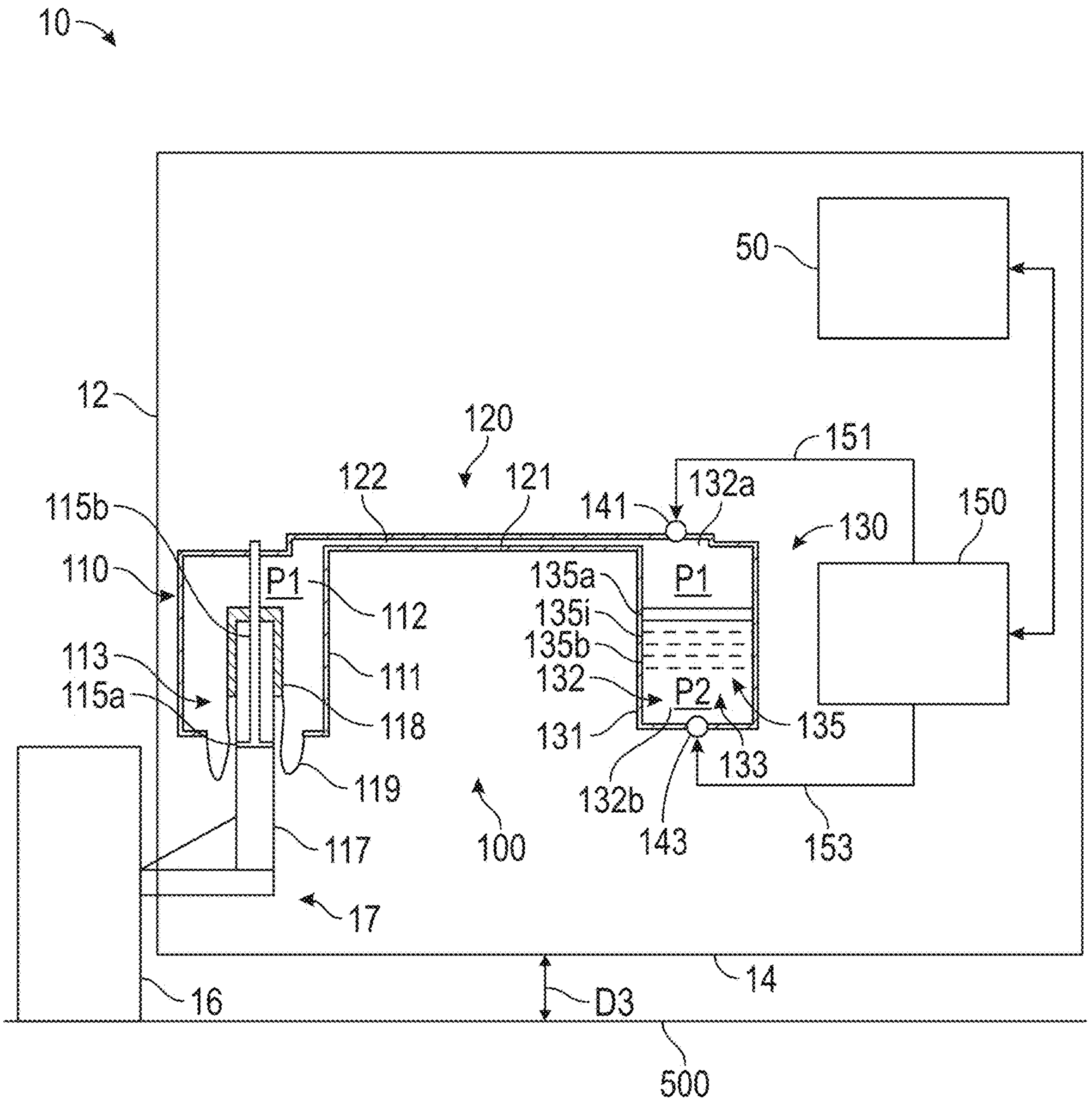
FIG. 4 shows the suspension assembly of FIG. 2 in a third configuration.

As shown in FIGS. 2-4, vehicle 10 includes one or more controllers 50 coupled to one or more fluid pressure devices 150. The one or more fluid pressure devices 150 is coupled to the one or more suspension assemblies 100. The one or more controllers 50 may be or may include, for example, an electronic control unit of the vehicle 10. The one or more fluid pressure devices 150 may be or include, for example, an air pump.

The vehicle 10 may further include a wheel support structure 17 which rotatably supports the wheel 16 on the vehicle body 12. The wheel support structure 17 may rotatably support the wheel 16 on the chassis 14.

The suspension assembly 100 includes a first damper assembly 110, a second damper assembly 130, and a fluid conduit assembly 120 connecting the first damper assembly 110 to the second damper assembly 130.

The first damper assembly 110 includes a first chamber casing 111 defining a first chamber 112 therein. A first piston assembly 113 is disposed in the first chamber 112. The first piston assembly 113 includes a first piston **115*a* fixed to the first chamber casing 111 via a piston rod 115*b*. The first piston assembly 113 further includes a first piston cylinder 117 fixed to the wheel support structure 17. The first piston 115*a* is movably disposed within the first piston cylinder 117. The first piston cylinder 117 may include a cylinder head 118 at an upper portion thereof. The cylinder head 118 may be coupled to the first chamber casing 111 via a bellows 119. The bellows 119 is elastic and allows the first chamber casing 111 to move with respect to the first piston cylinder 117 and the cylinder head 118. As a non-limiting example, the bellows 119 may be rubber. A portion of the first piston cylinder 117 below the first piston 115*a* is fluidly isolated from a portion of the first piston cylinder 117 above the first piston 115*a***.

The second damper assembly 130 includes a second chamber casing 131 defining a second chamber 132 therein. A second piston assembly 133 is disposed in the second chamber 132. The second piston assembly 133 includes a second piston 135. The second piston 135 is movably disposed within the second chamber 132 and separates the second chamber 132 into an upper chamber **132*a* and a lower chamber 132*b*. The upper chamber 132*a* is fluidly isolated from the lower chamber 132*b* by the second piston 135. Although not shown, the second piston assembly 133 may include additional structures, such as a piston rod, that allows the second piston to move within the second chamber 132**.

The fluid conduit assembly 120 includes a fluid conduit casing 121 defining a fluid conduit 122. The fluid conduit 122 fluidly connects the first chamber 112 to the upper chamber 132*a*. Thus, the first chamber 112, the fluid conduit 122, and the upper chamber 132*a* are fluidly connected. Fluid within the first chamber 112, the fluid conduit 122, and the upper chamber 132*a* is at a first pressure P1, and fluid within the lower chamber 132*b* is at a second pressure P2.

The upper chamber 132*a* may be fluidly connected to the one or more fluid pressure devices 150 via a first conduit 151. A first valve 141 may be disposed between the upper chamber 132*a* and the one or more fluid pressure devices 150. The first valve 141 is configured to close to prevent fluid flow therethrough and open to allow fluid flow therethrough. Although FIGS. 2-4 show the first valve 141 disposed on the second chamber casing 131, the first valve 141 may be disposed on the first chamber casing 111, the fluid conduit casing 121, or on the first conduit 151. The first valve 141 may be connected to the one or more controllers 50, and the one or more controllers 50 may control opening and closing of the first valve 141.

The lower chamber 132*b* may be fluidly connected to the one or more fluid pressure devices 150 via a second conduit 153. A second valve 143 may be disposed between the lower chamber 132*b* and the one or more fluid pressure devices 150. The second valve 143 is configured to close to prevent fluid flow therethrough and open to allow fluid flow therethrough. Although FIGS. 2-4 show the second valve 143 disposed on the second chamber casing 131, the second valve 143 may be disposed on the second conduit 153. The second valve 143 may be connected to the one or more controllers 50, and the one or more controllers 50 may control opening and closing of the second valve 143.

The controller 50, the first valve 141, and/or the one or more fluid pressure devices 150 may increase or decrease the first pressure P1. The one or more fluid pressure devices 150 may feed air into the first chamber 112, the fluid conduit 122, and/or the upper chamber 132*a* via the first conduit 151 to increase the first pressure P1, and the first valve 141 may be opened to decrease the first pressure P1.

The controller 50, the second valve 143, and/or the one or more fluid pressure devices 150 may increase or decrease the second pressure P2. The one or more fluid pressure devices 150 may feed air into the lower chamber 132*b* via the second conduit 153 to increase the second pressure P2, and the second valve 143 may be opened to decrease the second pressure P2.

FIG. 2 shows the suspension assembly 100 in a first configuration. The first configuration may be a configuration in which vehicle 10 is resting on a ground surface 500. The first configuration may be referred to as a static nominal ride height. In the first configuration, a distance between the chassis 14 and the ground surface 500 is a first distance D1. In the first configuration, the first piston 115*a* is in an intermediate position within the first piston cylinder 117 such that the vehicle body 12 is movable up and down with respect to the wheel 16. In the first configuration, the second piston 135 may be seated on an upper end of the second chamber casing 131.

While the vehicle 10 is traveling along the ground surface 500, the wheel 16 may undergo a decrease in and/or momentary release of the upward force (for example, immediately following the second configuration, when traveling over a pothole, or when traveling over a decline surface) resulting in the wheel moving downward with respect to the vehicle body 12, resulting in increase of the distance between the chassis 14 and the ground surface 500.

FIG. 3 shows the suspension assembly 100 in a second configuration in which a distance between the chassis 14 and the ground surface 500 is at maximum for the vehicle 10 while the wheels 16 are still in contact with the ground surface 500, herein referred to as a full rebound ride height.

In the second configuration, the distance between the chassis 14 and the ground surface 500 is a second distance D2. In the second configuration, the first piston 115*a* is at an uppermost position within the first piston cylinder 117 and abuts an upper wall of the cylinder head 118 such that the vehicle body 12 cannot move further upward with respect to the wheel 16. In the second configuration, the second piston 135 may be seated on an upper end of the second chamber casing 131. As a portion of the first piston cylinder 117 travels downward out of the first chamber 112 when moving from the first configuration to the second configuration, the first pressure P1 within the first chamber 112, the fluid conduit 122, and the upper chamber 132*a* decreases from the first configuration to the second configuration. As the second piston 135 is already seated on the upper end of the second chamber casing 131 in the first configuration, the second pressure P2 within the lower chamber 132*b* may remain constant when moving between the first and second configurations.

While the vehicle 10 is traveling along the ground surface 500, the wheel 16 may receive an increase in upward force (for example, when traveling over an uneven surface or an object on the ground surface 500 or over an incline surface), resulting in the wheel moving upward with respect to the vehicle body 12. The result is a reduction of the distance between the chassis 14 and the ground surface 500. FIG. 4 shows the suspension assembly 100 in a third configuration in which a distance between the chassis 14 and the ground surface 500 is at minimum for the vehicle 10 while the wheels 16 are still on contact with the ground surface 500, herein referred to as a full jounce ride height.

In the third configuration, the distance between the chassis 14 and the ground surface 500 is a third distance D3. In the third configuration, the first piston 115*a* is at a lowermost position within the first piston cylinder 117, as further movement downward is prevented by pressure within the first piston cylinder 117 below the first piston 115*a* increasing to a maximum pressure threshold due to fluid compression via the first piston 115*a*.

As a portion of the first piston cylinder 117 travels upward into the first chamber 112 when moving from the first configuration or the second configuration to the third configuration, the first pressure P1 within the first chamber 112, the fluid conduit 122, and the upper chamber 132*a* increases from the first configuration or the second configuration to the third configuration. The upward movement of the first piston cylinder 117 with respect to the first chamber casing 111 ceases once the first pressure P1 reaches a magnitude that corresponds to the upward force acting on the first piston cylinder 117 from the wheel 16. However, once the first pressure P1 exceeds the second pressure P2 within the lower chamber 132*b*, the second piston 135 moves downward from the upper end of the second chamber casing 131 until the second piston 135 is at an equilibrium position in which the first pressure P1 corresponds to the second pressure P2. As such, the second piston assembly 133 also absorbs some of the upward force.

The first distance D1 is greater than the third distance D3, and the second distance D2 is greater than the first distance D1 and the third distance D3.

The first distance D1, the second distance D2, and the third distance D3 may be controlled by controlling the first pressure. For example, the first pressure P1 may be increased to raise the vehicle, increasing the first distance D1, the second distance D2, and the third distance D3. The first pressure P1 may be decreased to lower the vehicle, decreasing the first distance D1, the second distance D2, and the third distance D3.

The second pressure P2 may correspond to an effective spring rate of the suspension assembly 100. When the suspension assembly 100 is moving towards the third configuration, if the second pressure P2 is higher, the first pressure P1 may increase to a higher magnitude because a volume of the first chamber 112 is constrained by the higher second pressure P2. Thus, the second piston 135 will be displaced later and less for a given wheel displacement from the first or second configuration.

When the suspension assembly 100 is moving towards the third configuration, if the second pressure P2 is lower, the first pressure P1 may increase to a lower magnitude because the volume of the first chamber 112 is allowed to expand further due to the lower second pressure P2. Thus, the second piston 135 will be displaced earlier and more for a given wheel displacement from the first or second configuration.

The equilibrium position of the second piston 135 may be adjusted by controlling the second pressure P2, which in turn controls ride frequency of the vehicle 10, which is the frequency at which the suspension assembly 100 moves between the first and third configurations. For example, the second pressure P2 may be increased such that the equilibrium position of the second piston 135 is at a first equilibrium position 135*a*, resulting in an increase in ride frequency of the vehicle 10.

Alternatively, the second pressure P2 may be decreased such that the equilibrium position of the second piston 135 is at a second equilibrium position 135*b*, resulting in a decrease in ride frequency. Additionally, as the second pressure P2 can be adjusted to any level between the second pressures P2 for the first equilibrium position 135*a* and the second equilibrium position 135*b*, the equilibrium position may be any position between the first equilibrium position 135*a* and the second equilibrium position 135*b*, including an intermediate equilibrium position 135*i* shown in FIG. 4.

The vehicle 10 may have multiple suspension modes. For example, the vehicle 10 may have a track mode with a relatively high ride frequency (e.g., 1.5 hz to 2.5 hz) and stiffer suspension for performance driving. This may result in a firmer ride. For example, the first equilibrium position 135*a* may correspond to the track mode.

The vehicle 10 may have a tour mode with low ride frequency (e.g., 1 hz to 1.5 hz) and softer suspension which prioritizes comfort. For example, the second equilibrium position 135*b* may correspond to the tour mode.

The one or more controllers 50 may switch between different suspension modes by controlling the first pressure P1 and/or the second pressure P2 via the one or more fluid pressure devices 150, the first valve 141, and/or the second valve 143.

The suspension assembly 100 according to one or more embodiments may allow suspension modes to be quickly switched by adjusting the first pressure P1 and/or the second pressure P2. Furthermore, instead of a limited number of discrete suspension modes, the suspension assembly 100 according to one or more embodiments may allow the suspension mode to be adjusted continuously between upper and lower thresholds.

Figure 5:
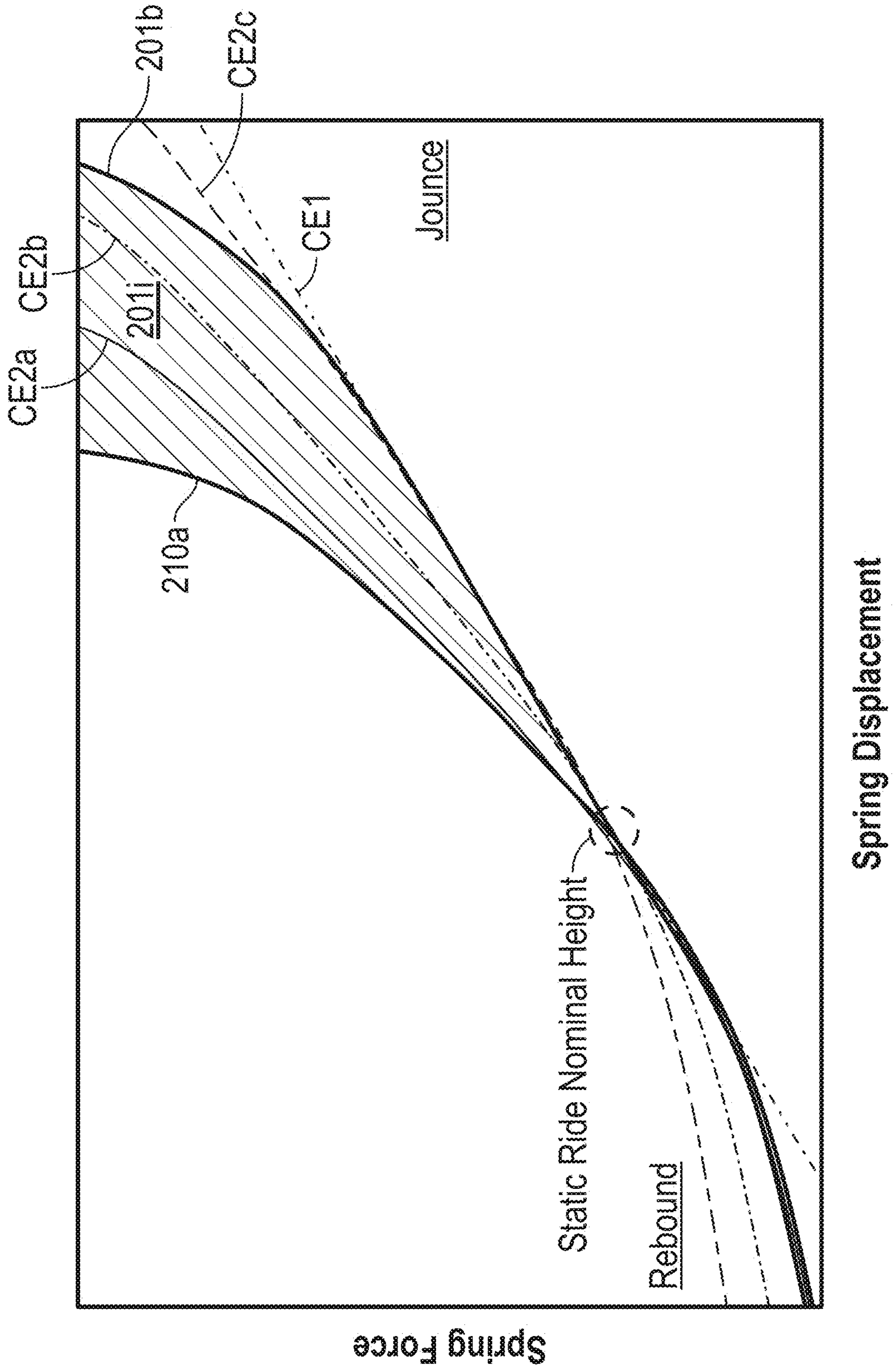
FIG. 5 shows a graph illustrating spring force vs spring displacement of a suspension assembly of one or more embodiments compared with comparative examples.

FIG. 5 shows spring force plotted against spring force for a first comparative example in which a suspension assembly has a coil spring, for a second comparative example in which a suspension assembly has three chamber air suspension, and for a non-limiting example of the suspension assembly 100 according to one or more embodiments. The term "spring displacement" may refer to the relative displacement between the wheel support structure 17 and the chassis 14, and "spring force" may refer to a magnitude of force acting on the suspension assembly. For the suspension assembly 100 and both comparative examples, the spring displacement vs spring displacement is equal at static ride nominal height. The spring force below the static ride normal height is considered rebound and the spring force above the static ride normal height is considered jounce.

Line CE1 corresponds to the first comparative example. The first comparative example has a substantially linear behavior from rebound to jounce. Because the coil spring is not adjustable, the suspension assembly of the first comparative example only allows for a single suspension mode.

Line CE2*a* corresponds to the second comparative example with one chamber of the three chamber air suspension being open, line CE2*b* corresponds to the second comparative example with two chambers of the three chamber air suspension being open, and line CE2*c* corresponds all three chambers of the three chamber air suspension being open. Due to the non-linear behavior of air suspensions, each of the lines CE2*a*, CE2*b*, CE2*c* of the second comparative example has non-linear behavior from rebound to jounce. Furthermore, opening additional chambers increases an effective chamber volume of the three chamber air suspension, allowing for three different modes. However, the three different modes are discrete modes, and the second comparative example does not allow for modes between the three distinct modes.

Line 201*a* corresponds to the track mode of the suspension assembly 100 according to one or more embodiments, and line 201*b* corresponds to the tour mode of the suspension assembly 100 according to one or more embodiments. Because the suspension assembly 100 includes the first chamber 112 and the second chamber 132 that are fluidly isolated from each other, the suspension assembly 100 allows for more precise pressure-based control of the effective spring rate curves, whereas the comparative example relies solely on volume control.

Between the track mode and the tour mode indicated by lines 201*a*, 201*b*, a shaded portion 201*b* corresponds to a range of possible intermediate modes 201*i* between the track mode and the tour mode. Because the first pressure P1 and the second pressure P2 are adjustable to any pressure, the suspension assembly 100 may set any intermediate mode between the track mode and the tour mode. That is, the suspension assembly 100 allows for a greater degree of freedom for different modes. Instead of a single mode as in the first comparative example or three distinct modes as in the second comparative example, the suspension assembly 100 allows for continuous adjustment between the tour and track modes by varying the first pressure P1 and/or the second pressure P2. Thus, the suspension assembly 100 may allow for any number of additional modes (e.g., sports mode, sports plus mode, balanced mode, etc.) between the track and tour modes. The track mode and the tour mode may correspond to first and second ride frequency modes, and the intermediate modes may correspond to intermediate ride frequency modes.

While the first damper assembly 110 is shown with a specific example of the first piston assembly 113, the first damper assembly 110 may include different types of damper structures. For example, the first damper assembly may include a monotube damper, a twin-tube damper, a magnetorheological damper, a continuous damping control assembly, and/or other dampers known in the art.

The one or more controllers 50 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system comprising:

one or more controllers; and a suspension assembly comprising:

a first damper assembly comprising a first chamber casing defining first chamber having a first pressure;

a second damper assembly comprising a second chamber casing defining a second chamber having a second pressure, the second chamber having a first portion fluidly connected to the first chamber and a second portion fluidly isolated from the first chamber; and one or more fluid pressure devices fluidly connected to the second chamber and configured to adjust the second pressure in the second chamber, wherein the one or more controllers is configured to control the one or more fluid pressure devices to adjust the second pressure in the second chamber, wherein the one or more controllers is configured to set a first ride frequency mode and control the second pressure to correspond to the first ride frequency mode, and wherein the one or more controllers is configured to set a second ride frequency mode and control the second pressure to correspond to the second ride frequency mode.

2. The system of claim 1, wherein the first damper assembly comprises a first piston assembly and the second damper assembly comprises a second piston assembly.

3. The system of claim 2, wherein the first piston assembly comprises a first chamber casing that defines the first chamber, a first piston fixed to the first chamber casing, and a first piston cylinder, the first piston being movable with respect to the first piston cylinder.

4. The system of claim 3, wherein the first piston cylinder is configured to move into the first chamber to increase the first pressure in the first chamber.

5. The system of claim 2, wherein the second piston assembly comprises a second piston fluidly isolating the first portion of the second chamber and the second portion of the second chamber.

6. The system of claim 5, wherein the second piston is movable toward the second portion due to the first pressure in the first portion to increase the second pressure in the second portion.

7. The system of claim 1, wherein the one or more fluid pressure devices is fluidly connected to the first chamber and configured to adjust the first pressure in the first chamber.

8. The system of claim 1, further comprising a fluid conduit fluidly connecting the first chamber to the first portion of the second chamber.

9. The system of claim 1, wherein the first portion of the second chamber is an upper chamber and the second portion of the second chamber is a lower chamber, the upper and lower chambers being separated by a second piston of the second damper assembly.

10. A vehicle comprising:

a vehicle body;

a wheel;

a wheel support structure that rotatably supports the wheel;

one or more controllers; and a suspension assembly that couples the vehicle body and the wheel support structure, the suspension assembly, comprising:

a first damper assembly comprising a first chamber casing defining a first chamber having a first pressure;

a second damper assembly comprising a second chamber casing defining a second chamber having a second pressure, the second chamber having a first portion fluidly connected to the first chamber and a second portion fluidly isolated from the first chamber; and one or more fluid pressure devices fluidly connected to the second chamber and configured to adjust the second pressure in the second chamber, wherein the one or more controllers is configured to control the one or more fluid pressure devices to adjust the second pressure in the second chamber, wherein the one or more controllers is configured to set a first ride frequency mode and control the second pressure to correspond to the first ride frequency mode, and wherein the one or more controllers is configured to set a second ride frequency mode and control the second pressure to correspond to the second ride frequency mode.

11. The vehicle of claim 10, wherein the first damper assembly comprises a first piston assembly and the second damper assembly comprises a second piston assembly.

12. The vehicle of claim 11, wherein the first piston assembly comprises a first chamber casing that defines the first chamber, a first piston fixed to the first chamber casing, and a first piston cylinder fixed to the wheel support structure and movable with respect to the first piston.

13. The vehicle of claim 12, wherein the first piston cylinder is configured to move into the first chamber due to forces transmitted from the wheel to increase the first pressure of the first chamber.

14. The vehicle of claim 11, wherein the second piston assembly comprises a second piston fluidly isolating the first portion of the second chamber and the second portion of the second chamber.

15. The vehicle of claim 14, wherein the second piston is movable toward the second portion due to the first pressure in the first portion to increase the second pressure in the second portion.

16. The vehicle of claim 10, wherein the one or more controllers is configured to set any intermediate ride frequency mode between the first ride frequency mode and the second ride frequency mode by adjusting the second pressure.

17. The vehicle of claim 11, further comprising a fluid conduit fluidly connecting the first chamber to the first portion of the second chamber.

18. The vehicle of claim 10, wherein the first portion of the second chamber is an upper chamber and the second portion of the second chamber is a lower chamber, the upper and lower chambers being separated by a second piston of the second damper assembly.

19. The vehicle of claim 10, further comprising an engine, a motor, or a hybrid engine and motor system that provides power to the wheel.

20. A vehicle comprising:

a vehicle body;

a wheel;

a wheel support structure that rotatably supports the wheel;

one or more controllers; and a suspension assembly that couples the vehicle body and the wheel support structure, the suspension assembly comprising:

a first damper assembly comprising a first chamber casing defining a first chamber having a first pressure;

a second damper assembly comprising a second chamber casing defining a second chamber having a second pressure, the second chamber having a first portion fluidly connected to the first chamber and a second portion fluidly isolated from the first chamber;

a fluid conduit fluidly connecting the first chamber to the first portion of the second chamber; and one or more fluid pressure devices fluidly connected to the second chamber and configured to adjust the second pressure in the second chamber, wherein the one or more fluid pressure devices is fluidly connected to the first chamber and configured to adjust the first pressure in the first chamber, wherein the first damper assembly comprises a first piston assembly and the second damper assembly comprises a second piston assembly, wherein the first piston assembly comprises a first chamber casing that defines the first chamber, a first piston fixed to the first chamber casing, and a first piston cylinder fixed to the wheel support structure and movable with respect to the first piston, wherein the first piston cylinder is configured to move into the first chamber due to forces transmitted from the wheel to increase the first pressure of the first chamber, wherein the first portion of the second chamber is an upper chamber and the second portion of the second chamber is a lower chamber, wherein the second piston assembly comprises a second piston fluidly isolating the upper chamber and the lower chamber, wherein the second piston is movable toward the second portion due to the first pressure in the first portion to increase the second pressure in the second portion, wherein the one or more controllers is configured to control the one or more fluid pressure devices to adjust the second pressure in the second chamber, wherein the one or more controllers is configured to set a first ride frequency mode and control the second pressure to correspond to the first ride frequency mode, wherein the one or more controllers is configured to set a second ride frequency mode and control the second pressure to correspond to the second ride frequency mode, and wherein the one or more controllers is configured to set any intermediate ride frequency mode between the first ride frequency mode and the second ride frequency mode by adjusting the second pressure.

* * * * *